United States Patent
Lee

(10) Patent No.: US 8,294,868 B2
(45) Date of Patent: Oct. 23, 2012

(54) LIQUID CRYSTAL DISPLAY DEVICE

(75) Inventor: Jin-Suk Lee, Yongin (KR)

(73) Assignee: Samsung Display Co., Ltd. (KR)

( * ) Notice: Subject to any disclaimer, the term of this patent is extended or adjusted under 35 U.S.C. 154(b) by 155 days.

(21) Appl. No.: 13/006,747

(22) Filed: Jan. 14, 2011

(65) Prior Publication Data

US 2011/0194062 A1 Aug. 11, 2011

(30) Foreign Application Priority Data

Feb. 11, 2010 (KR) .................. 10-2010-0012899

(51) Int. Cl.
*G02F 1/1339* (2006.01)
(52) U.S. Cl. ....................... 349/153; 349/122
(58) Field of Classification Search .............. None
See application file for complete search history.

(56) References Cited

U.S. PATENT DOCUMENTS

| | | | | |
|---|---|---|---|---|
| 7,714,974 B2* | 5/2010 | Lee et al. | .............. | 349/153 |
| 7,889,308 B2* | 2/2011 | Jeong | .............. | 349/153 |
| 2009/0009698 A1 | 1/2009 | Moon et al. | | |

FOREIGN PATENT DOCUMENTS

| | | |
|---|---|---|
| JP | 2004226654 | 8/2008 |
| KR | 1020040107937 A | 12/2004 |
| KR | 1020070003165 | 1/2007 |
| KR | 1020070116511 A | 12/2007 |
| KR | 1020080001401 A | 1/2008 |
| KR | 1020090002629 A | 1/2009 |

OTHER PUBLICATIONS

Korean Office Action dated May 12, 2011 in Korean Priority Application No. 10-2010-0012899.

* cited by examiner

*Primary Examiner* — Richard Kim
(74) *Attorney, Agent, or Firm* — Knobbe Martens Olson & Bear LLP

(57) ABSTRACT

A liquid crystal display device is disclosed. The liquid crystal display device includes: a first substrate, a second substrate facing the first substrate, a liquid crystal layer disposed between the first and second substrates, the liquid crystal layer including liquid crystal molecules and ionic impurities originated from a wall defining the liquid crystal layer, a common voltage line, formed on an outer area of the first substrate, a common electrode formed on the second substrate, and a seal line formed to cover the common voltage line the seal line including a conductive ball configured to attract ionic impurities toward a surface of the seal line when a polarized voltage is applied to the conductive ball.

20 Claims, 4 Drawing Sheets

LIQUID CRYSTAL DISPLAY DEVICE

CROSS-REFERENCE TO RELATED APPLICATIONS

This application claims the benefit of Korean Patent Application No. 10-2010-0012899, filed on Feb. 11, 2010, in the Korean Intellectual Property Office, the disclosure of which is incorporated herein in its entirety by reference.

BACKGROUND

1. Field

The present disclosure relates to a liquid crystal display device, and more particularly, to a liquid crystal display device which prevents the occurrence of spots on its edge.

2. Description of the Related Technology

Liquid crystal display devices are light-weight, thin, and driven with low power consumption, and are thus widely used as display devices, such as laptop computers or portable televisions (TV).

A liquid crystal display device is typically formed by bonding a thin film transistor (TFT) substrate, on which a TFT array is formed, and a color filter substrate, on which a color filter array is formed to one another, and a liquid crystal layer is disposed between the substrates. The TFT substrate and the color filter substrate are typically bonded to each other by a seal line formed by using a sealant along an edge of the TFT substrate. An alignment layer is formed on surfaces of the TFT substrate and the color filter substrate, which face each other, and the alignment layer is rubbed so that liquid crystals of the liquid crystal layer are aligned in a uniform direction.

The liquid crystal display devices display desired images on a screen by adjustment of an amount of transmitted light, based on the intensity of an electric field applied to the liquid crystals.

During the application of the electric field, operation of the liquid crystals may be affected if the sealant or ion impurities of the liquid crystals get attached to the alignment layer, thereby leaving an afterimage on the liquid crystal display device or a spot on the edge of the liquid crystal display device.

Specifically, a spot is typically generated on the edge of the liquid crystal display device, where an electric field is not generally applied. Improvements to the materials of the alignment layer, the sealant, and the liquid crystals have been contemplated. However, each device has individuality according to its material, and many materials are chosen during mass-production of the liquid crystal display device.

SUMMARY OF CERTAIN INVENTIVE ASPECTS

The present disclosure provides a liquid crystal display device for preventing a spot on an edge thereof, wherein the spot is generated when a sealant and an ion impurity of an alignment layer react with each other.

According to an aspect of the present invention, there is provided a liquid crystal display device including a first substrate, a second substrate facing the first substrate, and a liquid crystal layer disposed between the first and second substrates, the liquid crystal display device further including: a common voltage line, which is formed on an outer area of the first substrate and to which a common voltage is applied; a common electrode formed on the second electrode; and a seal line, which is formed to cover the common voltage line to adhere the first and second substrates to each other, includes a conductive ball for receiving the common voltage applied to the common voltage line, and attaches ion impurities of the liquid crystal layer to a surface of the seal line according to an electric field formed when the common voltage is applied.

The common voltage may be a polarization voltage.

The common voltage line may include: a first common voltage line to which the common voltage is applied from outside the liquid crystal display device; and a second common voltage line contacting the first common voltage line and the conductive ball.

According to another aspect of the present invention, there is provided a liquid crystal display device including a first substrate, a second substrate facing the first substrate, and a liquid crystal layer disposed between the first and second substrates, the liquid crystal display device further including: a common voltage line, which is formed on an outer area of the first substrate and to which a common voltage is applied; a transparent electrode line formed on the first substrate along the common voltage line while being spaced apart from the common voltage line inward; a common electrode formed on the second electrode; and a seal line, which is formed to cover a portion of the common voltage line to adhere the first and second substrates to each other, includes a conductive ball for receiving a voltage applied to the transparent electrode line, and attaches ion impurities of the liquid crystal layer to a surface of the seal line according to an electric field formed when the voltage is applied.

A portion of the transparent electrode line that extends outside the seal line may be covered by an alignment layer formed on the first substrate and may be disposed within an outer black matrix area formed on the second substrate.

The voltage applied to the transparent electrode line may be a polarization voltage. The voltage applied to the transparent electrode line may be an alternating current voltage.

The common voltage line may include: a first common voltage line to which the common voltage is applied from outside the liquid crystal display device; and a second common voltage line which is formed on at least one corner of the first substrate where the first common voltage line is disposed, and contacts the first common voltage line.

The seal line may cover at least a portion of the common voltage line.

One aspect is a liquid crystal display device including: a first substrate, a second substrate facing the first substrate, a liquid crystal layer disposed between the first and second substrates, the liquid crystal layer including liquid crystal molecules and ionic impurities originated from a wall defining the liquid crystal layer, a common voltage line, formed on an outer area of the first substrate, a common electrode formed on the second substrate, and a seal line formed to cover the common voltage line the seal line including a conductive ball configured to attract ionic impurities toward a surface of the seal line when a polarized voltage is applied to the conductive ball.

The common voltage line of the liquid crystal device may include: a first common voltage line, and a second common voltage line configured to contact the first common voltage line and the conductive ball, formed of a transparent conductive material.

The second common voltage line of the liquid crystal device may be formed of an indium tin oxide (ITO) or an indium zinc oxide (IZO).

The liquid crystal display may further include a short point configured to transfer the common voltage to the common electrode.

Another aspect is a liquid crystal display device including: a first substrate, a second substrate facing the first substrate, a liquid crystal layer disposed between the first and second substrates, the liquid crystal layer including liquid crystal molecules and ionic impurities originated from a wall defining the liquid crystal layer, a common voltage line formed on an outer area of the first substrate, a transparent electrode line formed on the first substrate along the common voltage line, spaced apart from the common voltage line inward and formed of a transparent conductive material, a common electrode formed on the second substrate, and a seal line formed to cover a portion of the common voltage line, including a conductive ball configured to receive a voltage applied to the transparent electrode line, and to attract ionic impurities toward a surface of the seal line when the voltage is applied.

A portion of the transparent electrode line that extends outside the seal line if the liquid crystal device may be covered by an alignment layer formed on the first substrate and is disposed within an outer black matrix area formed on the second substrate.

The transparent conductive material may include at least one of an indium tin oxide (ITO) and an indium zinc oxide (IZO).

The voltage applied to the transparent electrode line may be a polarization voltage.

The voltage applied to the transparent electrode line may be an alternating current voltage.

The liquid crystal display device may further include a short point for transferring the voltage to the common electrode.

The common voltage line of the liquid crystal device may include: a first common voltage line, and a second common voltage line formed on at least one corner of the first substrate where the first common voltage line is disposed, and configured to contact the first common voltage line.

The seal line may cover at least a portion of the common voltage line.

Another aspect is a liquid crystal display device including: a first substrate, a second substrate including an image display surface, a liquid crystal layer including a liquid crystal material and provided between the first and second substrates, where the liquid crystal layer has boundaries when viewed in a direction perpendicular to the image display surface, a common voltage line extending outside the boundaries of the liquid crystal layer when viewed in the direction perpendicular to the surface of the second substrate, a common electrode provided between the second substrate and the liquid crystal layer, and a seal extending between the common voltage line and the common electrode and defining the boundaries of the liquid crystal layer when viewed in the direction perpendicular to the surface of the second substrate, the seal including a sealant from which ionic impurities are dissolved into the liquid crystal material, the seal further including at least one conductive ball, where the at least one conductive ball is configured to attract at least part of the ionic impurities floating within the liquid crystal layer toward the boundaries thereof when a polarized voltage is applied to the at least one conductive ball.

The at least one conductive ball may electrically contact at least one of the common electrode and the common voltage line.

The at least one conductive ball may be substantially enclosed by the sealant

The seal may include only one conductive ball when viewed in a cross section of the seal taken in a plane perpendicular to the extension of the common voltage line.

The seal may include more than one conductive ball when viewed in a cross section of the seal taken in a plane perpendicular to the extension of the common voltage line.

The seal may have a width from about 500 to about 2,000 μm,

The seal may overlap with first and second alignment layers formed between the common voltage line and the common electrode line, in a width from about 0 to about 2,000 μm.

BRIEF DESCRIPTION OF THE DRAWINGS

The above and other features and advantages of the present disclosure will become more apparent by describing in detail certain exemplary embodiments with reference to the attached drawings in which.

DETAILED DESCRIPTION OF CERTAIN INVENTIVE EMBODIMENTS

Figure 1:
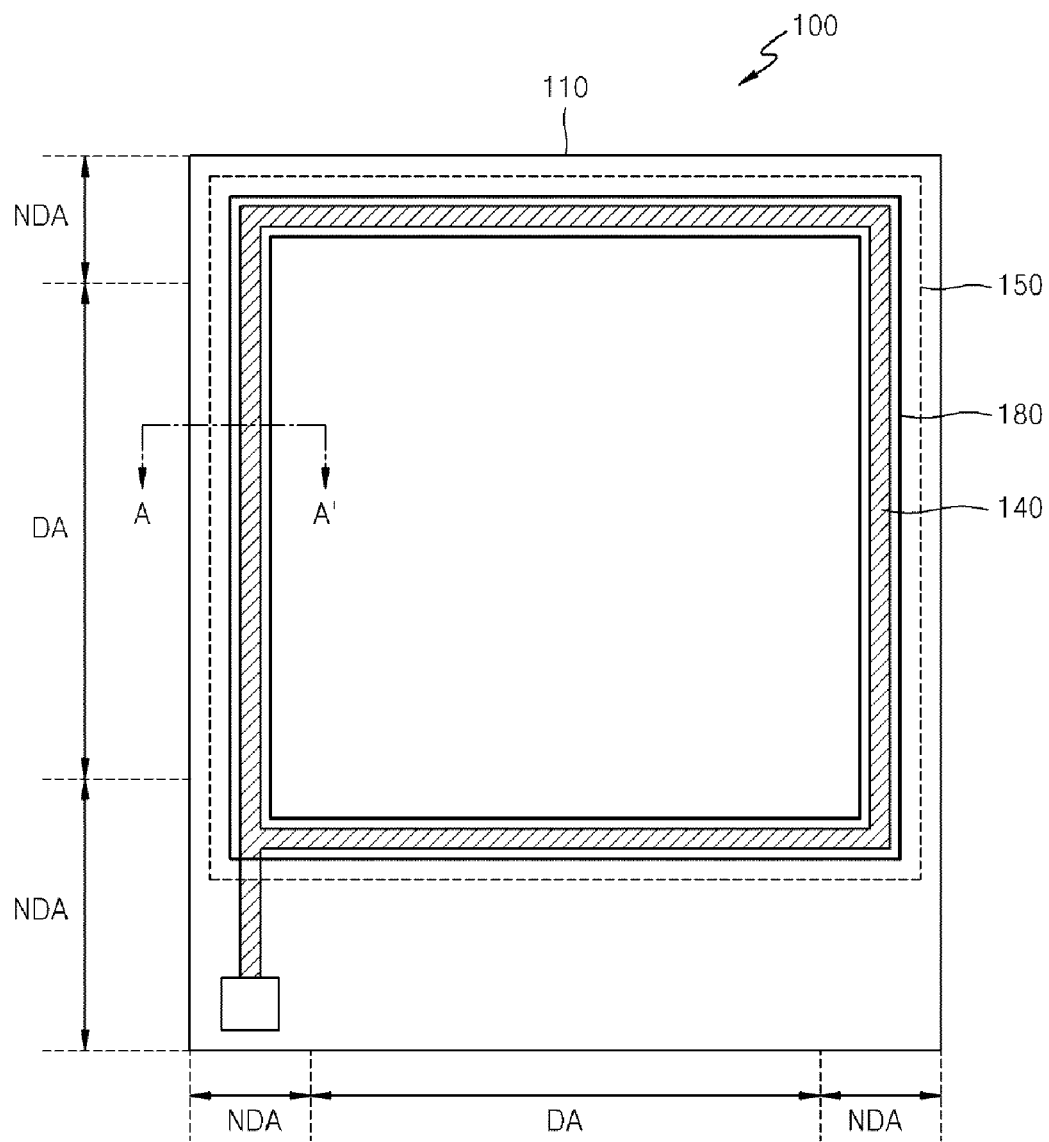
FIG. 1 is a plan view schematically illustrating an embodiment of a liquid crystal display device.

Hereinafter, embodiments of the present invention will be described more fully with reference to the accompanying drawings. In the drawings, like reference numerals denote like elements, and the sizes and thicknesses of layers and regions are exaggerated for clarity.

FIG. 1 is a plan view schematically illustrating an embodiment of a liquid crystal display device 100.

Referring to FIG. 1, the liquid crystal display device 100 includes a thin film transistor (TFT) substrate 110 and a color filter substrate 150 that are bonded to each other, wherein liquid crystals are injected between the TFT substrate 110 and the color filter substrate 150.

Pixels including a gate line for transferring a scan signal, a data line for transferring a data signal, a TFT connected to the gate and data lines, and a pixel electrode connected to the TFT, are formed on the TFT substrate 110, in a matrix. The TFT is driven by a scan signal applied through the gate line, and the TFT applies a data signal to the pixel electrode.

A common voltage line 140 is disposed on an outer area of the TFT substrate 110. The common voltage line 140 receives a common voltage from an external power source, and applies the common voltage to a common electrode formed on the color filter substrate 150. In the embodiment of FIG. 1, the common voltage line 140 is formed along four sides of the TFT substrate 110, but in other embodiments, may be formed along two or three sides of the TFT substrate 110. In one embodiment, the common voltage may be a polarization voltage.

A common electrode facing the pixel electrode and a color filter realizing a predetermined color by light are formed on the color filter substrate 150.

A seal line 180 formed by printing a sealant is formed along the common voltage line 140 on the outer areas of the TFT substrate 110 and/or the color filter substrate 150, thereby bonding the TFT substrate 110 and the color filter substrate 150 to each other. In one embodiment, the sealant includes a conductive ball to transfer the common voltage applied to the common voltage line 140 to the common electrode by connecting to the common voltage line 140 and the common electrode.

Although not illustrated in FIG. 1, a short point for connecting the common voltage line 140 and the common electrode of the color filter substrate 150 may be further formed on at least one of four corners of the liquid crystal display device 100. In such embodiments, the seal line 180 may not be formed on the short point. The short point may receive the common voltage from the common voltage line 140 and transfer the common voltage to the common electrode.

The TFT substrate 110 and the color filter substrate 150 may be physically and electrically bonded to each other by the seal line 180.

Figure 2:
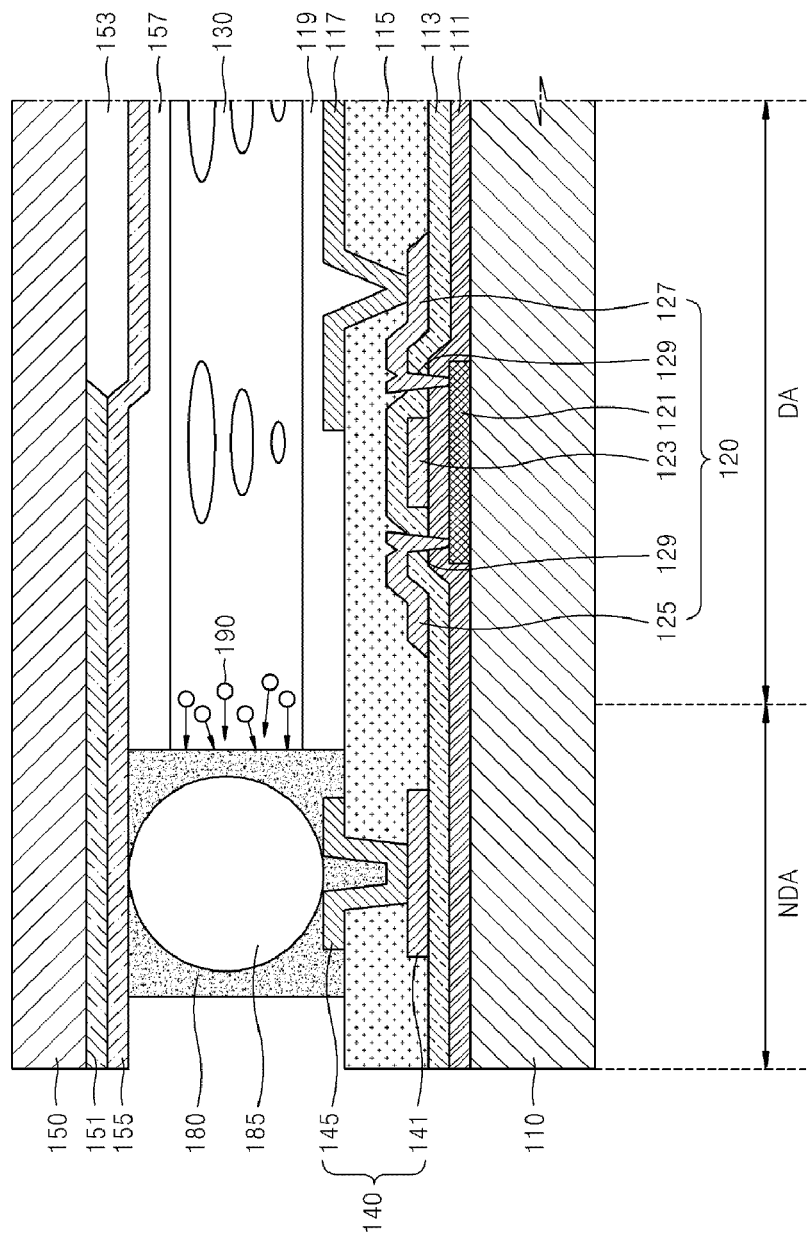
FIG. 2 is a cross-sectional view taken along line A-A' of FIG. 1.

FIG. 2 is a cross-sectional view taken along line A-A' of FIG. 1.

Referring to FIG. 2, the liquid crystal display device 100 includes the TFT substrate 110, the color filter substrate 150, and a liquid crystal layer 130.

The TFT substrate 110 includes a TFT 120 formed in a display area DA and the common voltage line 140 formed in an outer area, i.e., a non-display area NDA.

The TFT 120 includes an active layer 121, a gate electrode 123 above the active layer 121, and a source and drain electrodes 125 and 127 above the active layer 121. The active layer 121 is formed of a semiconductor material and is disposed above the TFT substrate 110 in a predetermined pattern. An insulating layer (not shown), such as a barrier layer and/or a buffer layer, may be disposed on a top surface of the TFT substrate 110 before the active layer 121 is formed, to (1) prevent an impurity from being diffused on the TFT substrate 110, (2) to prevent moisture or the air from penetrating into the TFT substrate 110, and (3) to flatten the surface of the TFT substrate 110.

A gate insulating layer 111 is disposed above the active layer 121, and the gate electrode 123 is formed on the gate insulating layer 111 in a predetermined pattern. An interlayer insulating layer 113 is formed on the gate electrode 123 to cover the gate electrode 123. After the interlayer insulating layer 113 is formed, the gate insulating layer 111 and the interlayer insulating layer 113 are etched according to a process such as a dry etching process, to form contact holes 129 to expose parts of the active layer 121. The source and drain electrodes 125 and 127 are electrically connected to the active layer 121 through the contact holes 129. A passivation layer 115 is formed to cover the source and drain electrodes 125 and 127. A pixel electrode 117 is formed in a predetermined pattern by etching the passivation layer 115 to be electrically connected to one of the source and drain electrodes 125 and 127. In some embodiments, the pixel electrode 117 may be formed of a transparent conductive material, such as an indium tin oxide (ITO) or an indium zinc oxide (IZO).

In some embodiments, the TFT 120 is a top gate type TFT. In other embodiments, it may be a bottom gate type TFT.

The common voltage line 140 is disposed along four sides on the outer area of the TFT substrate 110. The common voltage line 140 may include a first common voltage line 141 formed above the interlayer insulating layer 113 and a second common voltage line 145 contacting the first common voltage line 141 and formed above the passivation layer 115.

The first common voltage line 141 may be formed above the interlayer insulating layer 113 by using the same process as that used to form the source or drain electrode 125 or 127, or by using a separate process. The first common voltage line 141 may be formed of any one of various conductive materials. In some embodiments, the first common voltage line 141 may be formed of Mg, Al, Ni, Cr, Mo, W, MoW, or Au and the like.

The passivation layer 115 is formed to cover the first common voltage line 141. The second common voltage line 145 is formed in a predetermined pattern by etching the passivation layer 115 to be electrically connected to the first common voltage line 141. The second common voltage line 145 may be formed of a transparent conductive material, such as ITO or IZO. The second common voltage line 145 may be formed by using a process identical to or different from the process used to form the pixel electrode 117.

The common voltage line 140 may receive a common voltage and apply the common voltage to a common electrode 155. In one embodiment, the common voltage may be a direct current (DC) voltage having a polarity.

A first alignment layer 119 for aligning the liquid crystal layer 130 may be formed above the TFT substrate 110 to cover the pixel electrode 117. In the embodiment of FIG. 2, the first alignment layer 119 is not formed above the second common voltage line 145. In other embodiments, the first alignment layer 119 may be formed above the entire TFT substrate 110 to cover the second common voltage line 145 and the pixel electrode 117.

A color filter 153 and a black matrix 151 are disposed on a bottom surface of the color filter substrate 150, which faces the TFT substrate 110.

The color filter 153 includes RGB color filters that emit red, green, and blue according to incident light, and may be formed by patterning a color photoresist layer via a photolithography process, or by ejecting a color ink.

The black matrix 151 improves contrast of the liquid crystal display device 100 by blocking a light transmitted due to an undesired liquid crystal alignment, and prevents an optical leakage current of the TFT 120 by blocking light from being directly irradiated on the TFT 120. The black matrix 151 may be formed by ejecting an organic ink or by patterning a metal layer using a photolithography process. In some embodiments, in order to prevent the common voltage line 140 from being projected on a screen of the liquid crystal display device 100, the black matrix 151 may be formed around the seal line 180. The black matrix 151 may be formed of chrome (Cr), chrome oxide (CrOx), or an organic material.

The common electrode 155 is formed below the bottom surface of color filter substrate 150 including the black matrix 151 and the color filter 153. The common electrode 155 may be formed to cover the entire surface of the color filter substrate 150, without patterning a transparent electrode layer. The common electrode 155 may be formed of ITO or IZO. An over coating layer (not shown) formed of acrylic resin may be formed on the surface of the color filter substrate 150 including the black matrix 151 and the color filter 153, before the common electrode 155 is formed.

A second alignment layer 157 is formed below the color filter substrate 150 below which the common electrode 155 is formed. The second alignment layer 157 is not formed around the seal line 180 in the embodiment shown in FIG. 2. In other embodiments, the second alignment layer 157 may cover the entire surface of the color filter substrate 150 where the common electrode 155 is formed.

The seal line 180 is formed by printing a sealant on the common voltage line 140. The seal line 180 is continuously formed along the common voltage line 140, and bonds the TFT substrate 110 and the color filter substrate 150 to each other so as to encapsulate a liquid crystal material therebetween, while preventing the external air or moisture from penetrating into the liquid crystal layer 130. The seal line 180 may have a width from about 500 to about 2,000 µm, and may be formed to overlap with the first and second alignment layers 119 and 157 in a width from about 0 to about 2,000 µm.

The sealant may be a conductive sealant, and may include a conductive ball 185 formed of a conductive material, such as silver (Ag) or gold (Au) to electrically connect the common voltage line 140 to the common electrode 155 formed on a surface of the color filter substrate 150. A voltage applied to the first common voltage line 141 is transferred to the common electrode 155 through the second common voltage line 145 and the conductive ball 185.

A spot on an edge of a liquid crystal display device may be generated when an ion impurity of a sealant forming a seal line on the outer area of the liquid crystal display device diffuses to a display area of the liquid crystal display device and reacts with an alignment layer.

In one embodiment, the seal line 180 is formed by using the sealant including the conductive ball 185, and a polarization voltage is applied to the common voltage line 140 so that the ion impurity 190 having an opposite polarity is attached to the seal line 180. An electric field may be formed in the seal line 180 by applying a common voltage of a given polarity to the common voltage line 140, and the ion impurity 190 having the opposite polarity may be attached to the seal line 180. For example, when a voltage having a positive polarity (+), such as +10 V, is applied to the common voltage line 140, the voltage is applied to the conductive ball 185, and thus the ion impurity 190 having a negative polarity (−) may be attached to the seal line 180.

In one embodiment, during visual inspection of the liquid crystal display device 100, the electric field may be quickly formed in the seal line 180 by applying a high polarization voltage to the common voltage line 140, thereby attaching the ion impurity 190 to the seal line 180.

The ion impurity 190 may be attached to the seal line 180 by using the seal line 180 including the conductive ball 185 as an electric field forming path, without having to change a general layout of the liquid crystal display device 100. Accordingly, by holding the ion impurity 190 to the outer area of the liquid crystal display device 100, the ion impurity 190 is prevented from reacting with the first alignment layer 119 and/or the second alignment layer 157. Thus, formation of a spot on an edge of the liquid crystal display device 100 is prevented.

Figure 3:
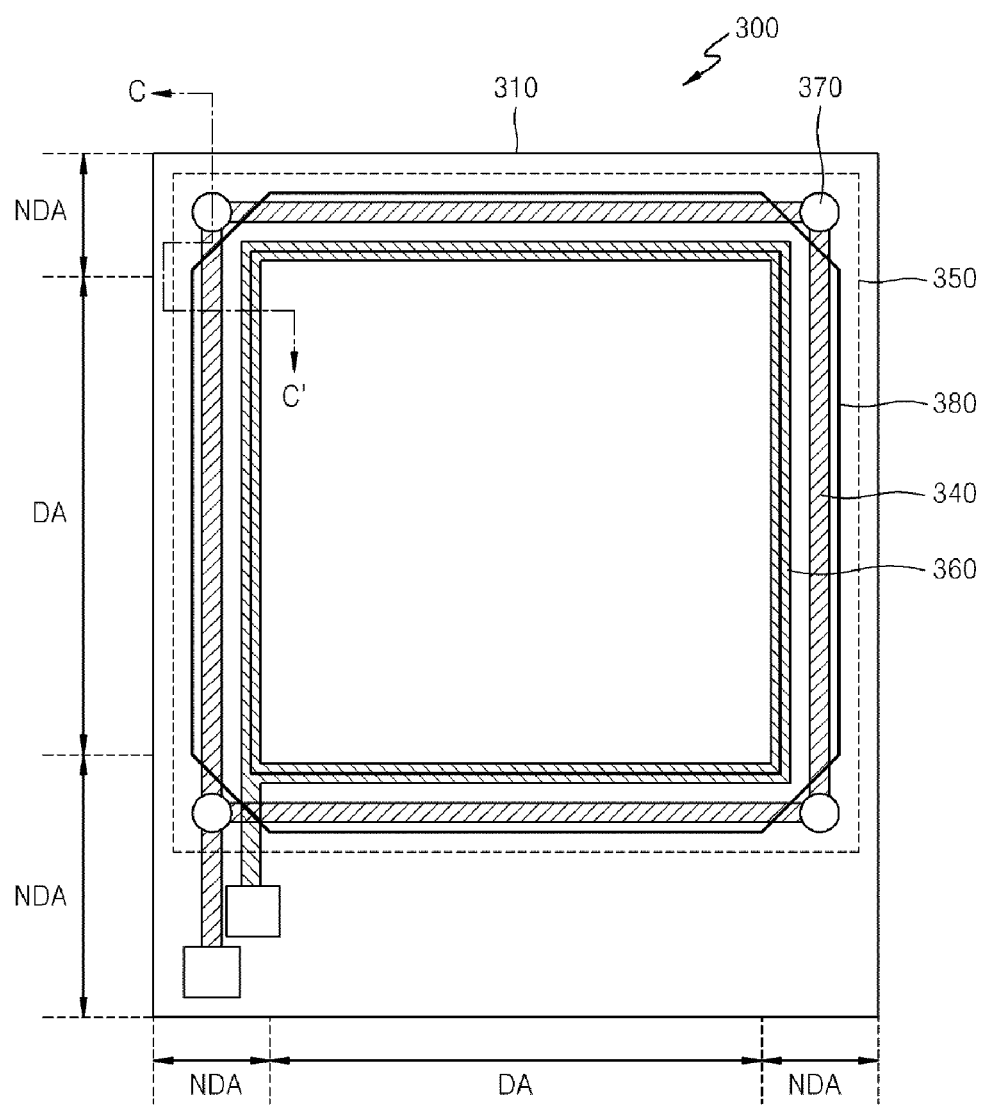
FIG. 3 is a plan view schematically illustrating an embodiment of a liquid crystal display device.

FIG. 3 is a plan view schematically illustrating another embodiment of a liquid crystal display device 300. Detailed descriptions about structures of the liquid crystal display device 300, which are identical to those of the liquid crystal display device 100 of FIG. 1, will not be repeated.

Referring to FIG. 3, the liquid crystal display device 300 includes a TFT substrate 310 and a color filter substrate 350 bonded to each other, wherein liquid crystals are injected between the TFT substrate 310 and the color filter substrate 350.

The TFT substrate 310 includes a TFT and a pixel electrode in a display area, and includes a common voltage line 340, a short point 370, and a transparent electrode line 360 spaced apart from the common voltage line 340 in an outer area, i.e., a non-display area. The color filter substrate 350 includes a color filter, a black matrix, and a common electrode.

In some embodiments, the common voltage line 340 receives a common voltage from an external power source, and applies the common voltage to the common electrode formed on the color filter substrate 350. In other embodiments, the transparent electrode line 360 may receive a separate voltage applied from the external power source, and transfer the separate voltage to the common electrode.

The short point 370 may be formed on at least one of the four corners of the TFT substrate 110, and connects the common voltage line 340 and the common electrode of the color filter substrate 350. The short point 370 may be formed by coating a conductive paste on the common voltage line 340 and hot-pressing the conductive paste. The short point 370 receives the common voltage from the common voltage line 340, and transfers the common voltage to the common electrode.

A seal line 380 printed with a sealant is formed on the outer areas of the TFT substrate 310 and the color filter substrate 350 to bond the TFT substrate 310 and the color filter substrate 350 to each other. The seal line 380 may cover a part of the transparent electrode line 360 and further cover at least a part of the common voltage line 340. In some embodiments, the seal line 380 may only cover the transparent electrode line 360. The sealant includes a conductive ball to transfer a polarization voltage or an alternating current (AC) voltage applied to the transparent electrode line 360 to the common electrode.

Figure 4:
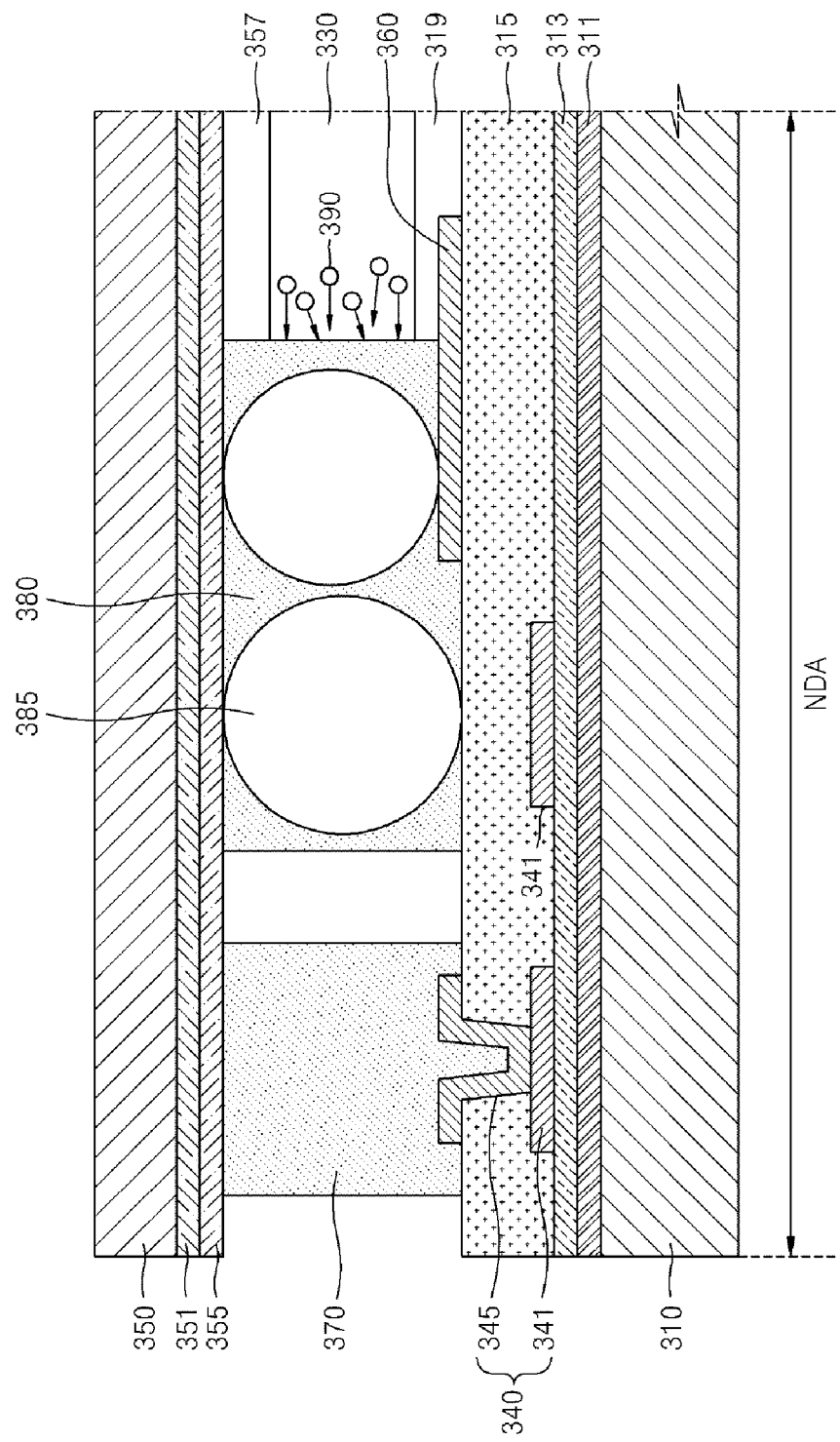
FIG. 4 is a cross-sectional view of an outer area taken along line C-C' of FIG. 3.

FIG. 4 is a cross-sectional view of an outer area taken along line C-C' of FIG. 3.

Referring to FIG. 4, the liquid crystal display device 300 includes a TFT substrate 310, a color filter substrate 350, and a liquid crystal layer 330.

The TFT substrate 310 includes a TFT (not shown) in a display area, and the common voltage line 340, the short point 370, and the transparent electrode line 360 in an outer area. The color filter substrate 350 includes a color filter (not shown) and a black matrix 351 on a surface facing the TFT substrate 310.

The structure of the TFT is identical to that of the TFT in the embodiment of FIG. 1, and thus detailed descriptions thereof are not repeated.

The common voltage line 340 is disposed along the four sides of the outer area of the TFT substrate 310. The common voltage line 340 may be formed of two parts, i.e., a first common voltage line 341 and a second common voltage line 345. The first common voltage line 341 is disposed on an interlayer insulating layer 313. The second common voltage line 345 is disposed on at least one corner of the TFT substrate 310 where the first common voltage line 341 is disposed. The second common voltage line contacts the first common voltage line 341, and is formed on a passivation layer 315.

The first common voltage line 341 may be formed on the interlayer insulating layer 313 by using the same process as that used to form a source or drain electrode of the TFT, or a separate process. The first common voltage line 341 may be formed of any one of various conductive materials. In some embodiments, the first common voltage line 341 may be formed of Mg, Al, Ni, Cr, Mo, W, MoW, or Au and the like.

The second common voltage line 345 is formed in a predetermined pattern by etching the passivation layer 315 covering the first common voltage line 341 to expose the first common voltage line 341. The second common voltage line 345 may be formed at a corner where the short point 370 is formed. The second common voltage line 345 may be formed of a transparent conductive material, such as ITO or IZO, and is electrically connected to the first common voltage line 341 by contacting the first common voltage line 345. The second common voltage line 345 may be formed by using a process identical to or separate from the process used to form the pixel electrode.

The common voltage line 340 may receive a common voltage and apply the common voltage to a common electrode 355 via the short point 370. The common voltage may be a DC voltage having a polarity.

The short point 370 electrically connects the second common voltage line 345 and the common electrode 355, and applies the common voltage applied to the first common voltage line 341 to the common electrode 355.

The transparent electrode line 360 is disposed above the passivation layer 315 and is spaced apart from the common voltage line 340. A part of the transparent electrode line 360 that extends toward outside the seal line 380 in a display area direction is covered by a first alignment layer 319 to overlap with the first alignment layer 319, and the transparent electrode line 360 is disposed correspondingly in an area of the black matrix 351 disposed on the outer area of the color filter substrate 350. The transparent electrode line 360 may be formed of a transparent conductive material, such as ITO or IZO. The transparent electrode line 360 may have a thickness from about 100 to about 2,000 μm.

The seal line 380 is formed along the transparent electrode line 360, and covers a part of the transparent electrode line 360. The seal line 380 may further cover at least a part of the common voltage line 340. The seal line 380 may have a width from about 500 to about 2,000 μm, and may overlap with the first alignment layer 319 and a second alignment layer 357 in a width from about 0 to about 2,000 μm.

The sealant may be a conductive sealant, and may include a conductive ball 385 formed of a conductive material, such as Ag or Au. The conductive ball 385 contacts the common electrode 355 and the transparent electrode line 360 to transfer a voltage applied to the transparent electrode line 360, to the common electrode 355.

The common voltage applied to the common voltage line 340 is transferred to the common electrode 355 via the short point 370, and the voltage applied to the transparent electrode line 360 is transferred to the common electrode 355 via the conductive ball 385.

The transparent electrode line 360 is disposed in the area of the black matrix 351, and a polarization voltage or an AC voltage may be applied to the transparent electrode line 360. When the polarization voltage is applied to the transparent electrode line 360, an ion impurity 390 having an opposite polarity is attached to the seal line 380 in an area of the black matrix 351. Accordingly, the ion impurity 390 is prevented from being diffused to the display area. Similarly, when an AC voltage is applied to the transparent electrode line 360, the ion impurity 390 is prevented from being attached to the first alignment layer 319. The ion impurity 390 is held near the seal line 380 and/or the transparent electrode line 360, and thus the ion impurity 390 is prevented from reacting with the first alignment layer 319 and/or the second alignment layer 357 by being diffused into the display area. Thus, a spot on an edge of the liquid crystal display device 300 may be prevented.

An ion impurity due to a sealant may be held in an outer area of a liquid crystal display device by applying a common voltage or a polarity-variable voltage to a common voltage line or a separate transparent electrode line. Accordingly, the ion impurity is prevented from diffusing to a display area of the liquid crystal display device, thereby preventing formation of a spot on an edge thereof.

By forming a seal line through the addition of a conductive ball to the sealant, an electric field is formed in the seal line. Accordingly, the ion impurity is further prevented from diffusing to the display area.

While the present disclosure has been particularly shown and described with reference to certain exemplary embodiments, it will be understood by those of ordinary skill in the art that various changes in form and details may be made therein without departing from the spirit and scope of the present invention.

What is claimed is:
1. A liquid crystal display device comprising:
a first substrate;
a second substrate facing the first substrate;
a liquid crystal layer disposed between the first and second substrates, the liquid crystal layer comprising liquid crystal molecules and ionic impurities originated from a wall defining the liquid crystal layer;
a common voltage line, formed on an outer area of the first substrate;
a common electrode formed on the second substrate; and
a seal line formed to cover the common voltage line the seal line comprising a conductive ball configured to attract ionic impurities toward a surface of the seal line when a polarized voltage is applied to the conductive ball.

2. The liquid crystal display device of claim 1, wherein the common voltage line comprises:
a first common voltage line; and
a second common voltage line configured to contact the first common voltage line and the conductive ball, formed of a transparent conductive material.

3. The liquid crystal display device of claim 2, wherein the second common voltage line is formed of an indium tin oxide (ITO) or an indium zinc oxide (IZO).

4. The liquid crystal display device of claim 1, further comprising a short point configured to transfer the common voltage to the common electrode.

5. A liquid crystal display device comprising
a first substrate;
a second substrate facing the first substrate;
a liquid crystal layer disposed between the first and second substrates, the liquid crystal layer comprising liquid crystal molecules and ionic impurities originated from a wall defining the liquid crystal layer;
a common voltage line formed on an outer area of the first substrate;
a transparent electrode line formed on the first substrate along the common voltage line, spaced apart from the common voltage line inward and formed of a transparent conductive material;
a common electrode formed on the second substrate; and
a seal line formed to cover a portion of the common voltage line, comprising a conductive ball configured to receive a voltage applied to the transparent electrode line, and to attract ionic impurities toward a surface of the seal line when the voltage is applied.

6. The liquid crystal display device of claim 5, wherein a portion of the transparent electrode line that extends outside the seal line is covered by an alignment layer formed on the first substrate and is disposed within an outer black matrix area formed on the second substrate.

7. The liquid crystal display device of claim 2, wherein the transparent conductive material comprises at least one of an indium tin oxide (ITO) and an indium zinc oxide (IZO).

8. The liquid crystal display device of claim 5, wherein the voltage applied to the transparent electrode line is a polarization voltage.

9. The liquid crystal display device of claim 5, wherein the voltage applied to the transparent electrode line is an alternating current voltage. The liquid crystal display device of claim 5, further comprising a short point for transferring the voltage to the common electrode.

10. The liquid crystal display device of claim 5, wherein the common voltage line comprises:
a first common voltage line; and
a second common voltage line formed on at least one corner of the first substrate where the first common voltage line is disposed, and configured to contact the first common voltage line.

11. The liquid crystal display device of claim 10, wherein the second common voltage line is formed of a transparent conductive material.

12. The liquid crystal display device of claim 11, wherein the transparent conductive material comprises ITO or IZO.

13. The liquid crystal display device of claim 5, wherein the seal line covers at least a portion of the common voltage line.

14. A liquid crystal display device comprising:
a first substrate;
a second substrate comprising an image display surface;
a liquid crystal layer comprising a liquid crystal material and provided between the first and second substrates, wherein the liquid crystal layer has boundaries when viewed in a direction perpendicular to the image display surface;
a common voltage line extending outside the boundaries of the liquid crystal layer when viewed in the direction perpendicular to the surface of the second substrate;
a common electrode provided between the second substrate and the liquid crystal layer; and
a seal extending between the common voltage line and the common electrode and defining the boundaries of the liquid crystal layer when viewed in the direction perpendicular to the surface of the second substrate, the seal comprising a sealant from which ionic impurities are dissolved into the liquid crystal material, the seal further comprising at least one conductive ball, wherein the at least one conductive ball is configured to attract at least part of the ionic impurities floating within the liquid crystal layer toward the boundaries thereof when a polarized voltage is applied to the at least one conductive ball.

15. The liquid crystal display device of claim 14, wherein the at least one conductive ball electrically contacts at least one of the common electrode and the common voltage line.

16. The liquid crystal display device of claim 14, wherein the polarized voltage is applied through the common voltage line.

17. The liquid crystal display device of claim 14, further comprising a transparent electrode line formed on the first substrate along the common voltage line, spaced apart from the common voltage line inward and formed of a transparent conductive material.

18. The liquid crystal display device of claim 17, wherein the polarized voltage is applied through transparent electrode line.

19. The liquid crystal display device of claim 14, wherein the seal has a width from about 500 to about 2,000 μm.

20. The liquid crystal display device of claim 14, wherein the seal overlaps with first and second alignment layers formed between the common voltage line and the common electrode line, in a width from about 0 to about 2,000 μm.

* * * * *

UNITED STATES PATENT AND TRADEMARK OFFICE
CERTIFICATE OF CORRECTION

PATENT NO. : 8,294,868 B2  
APPLICATION NO. : 13/006747  
DATED : October 23, 2012  
INVENTOR(S) : Lee Page 1 of 1

It is certified that error appears in the above-identified patent and that said Letters Patent is hereby corrected as shown below:

In the Specifications:

In column 3 at line 61, please delete "sealant", and insert --sealant.--.

In column 4 at line 2, please delete "μm,", and insert --μm.--.

In the Claims:

In column 10, line 58, Claim 9, please delete "The liquid crystal display device of claim 5, further comprising a short point for transferring the voltage to the common electrode.".

Signed and Sealed this  
Fourteenth Day of May, 2013

Teresa Stanek Rea  
*Acting Director of the United States Patent and Trademark Office*